United States Patent Office 3,431,214
Patented Mar. 4, 1969

3,431,214
COMPACTED SULFUR AND METHOD OF
PRODUCING SAME
Harold McDonald, Harrington Park, N.J., assignor to
Stauffer Chemical Company, New York, N.Y., a corporation of Delaware
No Drawing. Filed Aug. 22, 1966, Ser. No. 573,823
U.S. Cl. 252—189                                11 Claims
Int. Cl. C09k 3/00

ABSTRACT OF THE DISCLOSURE

A method for making non-dusting, free flowing, stable sulfur pellets by compacting a mixture of sulfur with from about 2 percent to about 40 percent by weight of petrolatum.

---

The present invention relates to the production of compacted sulfur, especially in the form of sulfur pellets, and more particularly, it relates to the use of a novel binding agent in the production of stable, free flowing, sulfur pellets. In one aspect, the present invention relates to a novel product in pellet form comprising sulfur in combination with a novel binding agent, and, in another aspect, the invention relates to a novel process for the production of pelleted sulfur.

Sulfur, as conventionally supplied in the form of a fine powder, is difficult to handle since it is not free flowing and tends to agglomerate in storage hoppers and conveyers through which it must be passed in various processing operations. It also forms a fine dust in the atmosphere which presents serious hazards of explosion and fires. For these and other reasons attempts have been made in the past to supply sulfur compacted in the form of small pellets of one type or another. Certain products of the prior art have utilized a relatively large percentage of binding media such as, e.g., hydrocarbon oils or smaller amounts of conditioning agents such as talc, tricalcium phosphate, etc., in an attempt to provide suitable handling characteristics, thereby adding materially to the production costs. Unfortunately, however, none of the agents heretofore known in the treatment of sulfur to improve its handling characteristics are completely suitable and none of the known agents satisfy each of the essential factors in the production of commercially acceptable, pelleted sulfur product. The essential factors include meeting the "sulfur end use" requirements such as, e.g., dispersion in rubber stocks, no detrimental effect upon the rubber cure properties, non-staining, non-harmful to the properties of the cured rubber, as well as meeting processing and sulfur product requirements. Additionally, the binding agent must be low in cost, preferably of about the same price as the raw sulfur material. One of the processing requirements is that the binding agent must have a relatively low melting point, preferably below about 100° F., while at the same time having a very low viscosity index. These properties are required in order to minimize the energy required to convert the binding agent into a suitable form for blending with the sulfur as well as for achieving desirable working properties of the resulting sulfur-binder admixture. Pellet hardness, amount of "fines" present, and the particle size of the sulfur in the pellet comprise the chief product requirements of the pelleted sulfur. It is therefore an object of the present invention to overcome and eliminate the deficiencies and problems inherent in the compaction of sulfur and to provide, in particular, pelleted sulfur in an economically attractive manner.

Another object of the present invention is to provide a commercially acceptable sulfur-binding agent composition which satisfies the end use and product requirements for a wide variety of commercial grades of sulfur.

Another object of the present invention is to provide a novel, low cost binding agent suitable for the production of commercially acceptable sulfur pellets, and particularly suited for use in vulcanizing rubber.

Another object of the present invention is to provide an economcially attractive process for making pelleted sulfur.

Other objects and advantages inherent in the present invention will become apparent to those skilled in the art from the following description and disclosure.

The present invention in its various aspects is predicated upon the discovery that petrolatum is uniquely suited for use as a binding agent in making pelleted sulfur. Surprisingly, petrolatum, which is a unique composition containing paraffinic as well as olefinic hydrocarbon fractions in a naturally emulsified blend, meets each of the above stated essential factors for the production of pelleted sulfur including the requirement of low cost, while various individual constituents of which petrolatum is composed fail in one or more of the essential requirements.

The term "petrolatum," as employed herein, refers to a semi-solid, gelatinous, amorphous mass, which appears amber to colorless depending upon its grade and purity, having a consistency which varies with temperature. Petrolatum comprises chiefly hydrocarbons of the methane series, $C_{16}H_{34}$ up to $C_{32}H_{66}$, and of the olefin series, $C_{16}H_{32}$ and higher. While petrolatum is a mixture containing chiefly the constituents listed above, it is not a simple mixture. For example, if paraffin wax is mixed with white mineral oil, the resulting material is not a true petrolatum since it will separate and not have the fiber structure of petrolatum. A permanent mixture requires the presence of a component whose stabilizing action would be similar to an emulsifying agent in the preparation of a permanent oil in water emulsion. Since petrolatum is a soft type microcrystalline wax, it is often defined in terms of its distinguishing features over microcrystalline and paraffin waxes.

Microcrystalline wax is a solid hydrocarbon mixture of microcrystalline structure, having an ASTM consistency below 85 and a kinematic viscosity at 210° F. above 5.75 centistokes. Petrolatum is a soft type microcrystalline wax having an ASTM consistency above 85. Paraffin wax is a solid hydrocarbon mixture of crystalline structure having a kinematic viscosity at 210° F. below 5.75 centistokes. The specific gravity of petrolatum varies between 0.815–0.880 at 60° C. and it has a melting point which may vary between 38–60° C. depending upon its grade.

The so-called "natural petrolatums" can be produced, e.g., by fractional distillation of still residues from the steam distillation of paraffin-base petroleum, or from steam-reduced amber crude oils (oils from which the light fractions have been removed). "Artificial petrolatums" can be made, e.g., by mixing heavy petroleum lubricating oil with a paraffin wax of low melting point. While it is apparent that petrolatum can be obtained in a wide variety of grades and purities, relatively crude grade "natural petrolatum" is preferred for use in the present invention.

In accordance with the process of the present invention, petrolatum, preferably in the liquid state, is admixed with finely divided sulfur in a suitable mixing or blending zone. Sufficient agitation is provided in order to permit thorough mixing or blending of the sulfur and petrolatum. Following the mixing period the resulting sulfur-petrolatum mixture is passed through a suitable compaction zone in order to produce a compacted product of the desired size and shape. Preferably, the mixture is formed into pellets by passage through pellet forming means known in the art, although it is to be understood that the sulfur-petrolatum mixture can be compacted by other known compaction means such as, e.g., by bricquetting means as well as roll compaction means suitable for producing a sheet of material followed by a suitable sheet cutting or breaking operation.

In accordance with a preferred embodiment, the sulfur-petrolatum mixture is passed through a foraminous plate to produce a plurality of elongated strands, preferably cylinders, of extruded material which are cut or broken into pellets of the desired length by suitable means. While uncompacted, finely divided sulfur is dusty, has a tendency to form agglomerates, and constitutes a hazard of explosion as well as a health hazard, compacted sulfur, and in particular, the pelleted sulfur produced in accordance with the process of the present invention, has been found to be free flowing and non-dusting, exhibiting superior flow and handling characteristics even after being subjected to storage for an extended period of time. These pellets disperse surprisingly well in rubber stock and the binding agent is compatible with both natural and synthetic rubbers. Moreover, from the standpoint of economics, by reason of the low cost and ease of processing using crude petrolatum, the pelleted material is extremely economical to use.

One alternative embodiment of the process of the present invention which has been found useful in reducing processing costs, especially in the compaction of finely divided sulfur of extremely small particle size, e.g., 1–50 microns, involves dissolving petrolatum in a suitable solvent such as, for example, methylene chloride, and then admixing the resulting solution with the finely divided sulfur in a suitable mixing zone in the manner set forth above. After thorough mixing has been achieved, the blend is adjusted for proper extrusion consistency by allowing solvent to evaporate. Following extrusion and pelleting the solvent is preferably removed, for example, by air drying and recycled for reuse. Even extremely fine sulfur material having very great surface area per unit volume can be satisfactorily admixed with petrolatum and extruded to make pellets in an economically practicable manner in accordance with this embodiment of the present invention. In the selection of a suitable solvent, at least three factors must be taken into account. Firstly, of course, the material must satisfactorily dissolve petrolatum, secondly, it should have a low boiling point such that it can be readily removed from the product, and thirdly, of critical importance in the processing of polymeric sulfur (i.e., amorphous, insoluble sulfur which is used in rubber stocks to prevent sulfur "bloom"), the solvent must not dissolve the polymeric sulfur or permit it to recrystallize in the rubber-soluble, rhombic form. In addition to methylene chloride, carbon disulfide has been found to satisfy each of the requirements set forth above. It is apparent that any number of solvents can be selected satisfying these requirements outlined in accordance with the present invention.

In accordance with the present invention, petrolatum is an effective binding agent in the compaction of a wide variety of grades of finely divided sulfur. The particle size range of commercal grades of sulfur usually varies between about 1–200 microns. The coarse grades of ground sulfur known as "Rubbermakers' sulfur" generally contain high percentages of the rubber soluble, crystalline form of sulfur while the finer grained, more highly refined grades of sulfur such as, e.g., "Flowers of sulfur" usually contain a higher percentage of the amorphous, rubber-insoluble sulfur. The insoluble fraction of sulfur is a deterrent to the phenomenon known in the rubber-making art as "blooming" or migration of the sulfur to the surface. Super-refined sulfur having an appreciable fraction of particles in the size range as low as 2–10 microns and having as high as 90% of the insoluble form of sulfur, e.g., sulfur sold under the name "Crystex," can, likewise, be satisfactorily compacted employing petrolatum as a binding agent. The percentage of petrolatum which is required to produce pelleted sulfur which satisfies the essential factors or requirements hereinbefore set forth varies over a wide range depending, chiefly, upon the particle size of the finely divided sulfur. The percentage of petrolatum required generally increases as the particle size of the sulfur decreases, i.e., as the surface area per unit volume increases. While very coarse sulfur, e.g., 200 microns, can be made into satisfactory pellets employing as low as about 2% petrolatum, very fine sulfur, e.g., 2–10 microns, requires as much as 40% petrolatum to make satisfactory pellets. Generally, however, where a suitable solvent is employed as described above, the petrolatum requirement can be substantially decreased. It has been determined for the purpose of making satisfactory pellets from Rubbermakers' sulfur which has a particle size range between about 50 and 200 microns that between about 8% and about 15% by weight crude petrolatum is required in order to satisfy the essential product end use and processing requirements. Pellets containing less than about 7.5% crude petrolatum were found to disperse in an unsatisfactory manner in rubber stocks. On the other hand, pellets containing above 15% crude petrolatum were found to be too soft or plastic and agglomerated into lumps during storage. Pellets containing about 10% petrolatum were found highly satisfactory in all respects.

Having thus described the invention in general terms, reference is now made to specific examples of operation which are presented only for the purposes of illustration and for enabling one skilled in the art to carry out the process of the present invention.

EXAMPLE 1

Finely divided rubbermakers sulfur in the amount of 360 grams was introduced into a Read mixer. The particle size range of the sulfur is specified as follows with reference to U.S. standard mesh screen size: 100% thur No. 80; 99.5 thru No. 100, 90–95 thru No. 200; 90 thru No. 325. Petrolatum in the amount of 40 grams was heated to its melting point (95–100° F.) and then slowly admixed with sulfur contained in the mixer. The petrolatum employed in this example is available under the name Molol, for example, which is natural petrolatum specified in Table I as follows:

Table I

| | |
|---|---|
| Saybolt melting point, ° F. | 75/95 |
| Saybolt viscosity; | |
| At 100° F. | 950 |
| At 210° F. | 103 |
| Viscosity index | 120 |
| Flash point, ° F. | 550 |
| ASTM consistency | 225/300 |
| Carbon residue | 0.4/0.7 |
| Specific gravity | 0.873 |
| Iodine | 11.0 |
| Aniline points, ° C. | 125 |
| Color | Dark |

The mixture was blended for twenty minutes after which which it was extruded into elongated cylinders. The extrusion die contained ⅛-inch diameter orifices on centers ¼-inch apart. Extruded cylinders of the sulfur-petrolatum mixture were then placed in a glass bottle and rolled on a small laboratory "drum roller" to produce pellets having an approximately spherical shape. The pellets so produced were tested and found to be free flowing, non-dusting, and disperse in rubber stock as well as non-pelleted control samples of the same sulfur. These sulfur pellets did not compact into an agglomerated mass after being subjected to storage conditions approximating those present in pallet load storage of fifty-pound bags.

EXAMPLE 2

Finely divided sulfur in the amount of 400 grams was charged into a Read mixer. The sulfur employed in this example contains about 90% insoluble sulfur and has a particle size range specified as follows: 100% thru No. 80 mesh; 99.5 thru 100 mesh; 95% thru No. 200 mesh, 80% thru No. 325 mesh. Such sulfur is available commercially under the name Crystex, for example. 100 grams of a high grade petrolatum of medium consistency, e.g., Protopet 2A, were dissolved in methylene chloride (100 grams); and the resulting solution was then gradually added to the sulfur in the mixer. After thorough mixing, the blended material was adjusted for proper extrusion consistency by evaporating part of the methylene chloride. Following extrusion through the foraminous plate specified above in Example I, the cylinders were rolled into pellets and allowed to dry in air for complete removal of methylene chloride. It is found that the percentage of petrolatum required to achieve satisfactory compaction of high grade sulfur having extremely small particle size, e.g., Crystex, can be reduced from about 40% to about 25% employing the method illustrated by way of this example.

EXAMPLE 3

Several thousand pounds of pelletized sulfur have been produced satisfactorily in the following manner. The sulfur and petrolatum specified in Example 1 were blended in a continuous zig-zag type liquid-solids blender manufactured by Patterson-Kelley Co., Inc., by pumping molten chamber containing the finely divided sulfur. The relative sulfur and petrolatum feed rates were adjusted to supply about 10% by weight petrolatum to the sulfur being passed through the blender. The resulting sulfur-petrolatum blend was discharged from the mixer in a particle size range of about 20 to 80 mesh. The sulfur-petrolatum blend was then fed into a pellet mill, in this example the "Super" Pellet ACE, Model 501-D made by Sprout-Waldron Company. The blend was extruded to form pellet by passage through a rotating cylindrical die (⅛" x 1⅜", 300 r.p.m.) at the rate of 5,600 lbs./hr.

Sulfur-petrolatum blend containing 5%, and 7½% petrolatum (by weight) were also produced in the manner described above in this example. Pellets made containing 5%, 7½%, and 10% petrolatum were subjected to a conventional rubber dispersion test (Pale Crepe Rubber Method S-41). The pellets containing 10% petrolatum alone, showed satisfactory dispersion in rubber. The pellets containing 10% petrolatum remain discrete, readily flowable, and non-dusting after bag storage over a protracted period of time.

What is claimed is:

1. A process which comprises admixing finely divided sulfur and from about 2 percent to about 40 percent by weight of petrolatum, intimately blending said materials and then compacting the resulting sulfur petrolatum blend to produce discrete, nondusting, flowable particles.

2. The process of claim 1 in which said petrolatum is introduced in the liquid state.

3. The process of claim 2 in which said petrolatum is introduced as a liquid at a temperature above its melting point.

4. The process of claim 2 in which said petrolatum is introduced as a liquid solution with a solvent therefor, said solvent being of low boiling range to facilitate removal from the product and wherein when used with amorphous sulfur inert to the amorphous form.

5. The process of claim 4 in which said solvent comprises methylene chloride.

6. The process of claim 4 in which said solvent comprises carbon disulfide.

7. The process of claim 8 in which said pellets are formed by extruding said blend through a zone containing foramina to produce a plurality of elongated strands and cutting said strands to make pellets of the desired length.

8. A novel composition useful in producing discrete, non-dusting, stable and free-flowing compacted particles containing sulfur consisting essentially of finely divided sulfur and from about 2 percent to about 40 percent by weight of petrolatum intimately blended therewith.

9. The composition of claim 8 in the form of discrete, stable, and free flowing compacted particles.

10. The composition of claim 8 in pellet form.

11. Sulfur containing pellets having improved storage, handling and rubber dispersion characteristics consisting essentially of between about 8 percent and about 15 percent by weight petrolatum, the remainder being essentially sulfur.

References Cited

UNITED STATES PATENTS

| | | | |
|---|---|---|---|
| 2,442,781 | 6/1948 | Rostler | 260—775 X |
| 2,757,075 | 7/1956 | Haimsohn | 167—20 X |
| 3,215,599 | 11/1965 | Thau et al. | 167—63 |

MAYER WEINBLATT, *Primary Examiner.*

I. GLUCK, *Assistant Examiner.*

U.S. Cl. X.R.

23—229; 252—182; 260—775

UNITED STATES PATENT OFFICE
CERTIFICATE OF CORRECTION

Patent No. 3,431,214                                              March 4, 1969

Harold McDonald

It is certified that error appears in the above identified patent and that said Letters Patent are hereby corrected as shown below:

Column 4, line 40, "thur" should read -- thru --; line 62, cancel "which". Column 5, line 31, after "molten" insert -- petrolatum at a temperature of about 125° F. into the mixing --.

Signed and sealed this 31st day of March 1970.

(SEAL)
Attest:

Edward M. Fletcher, Jr.                              WILLIAM E. SCHUYLER, JR
Attesting Officer                                              Commissioner of Patents